Sept. 26, 1944.   R. C. HUGHES   2,359,111
AUTOMATIC VENT FOR FLUID PRESSURE REGULATORS
Filed Sept. 8, 1941
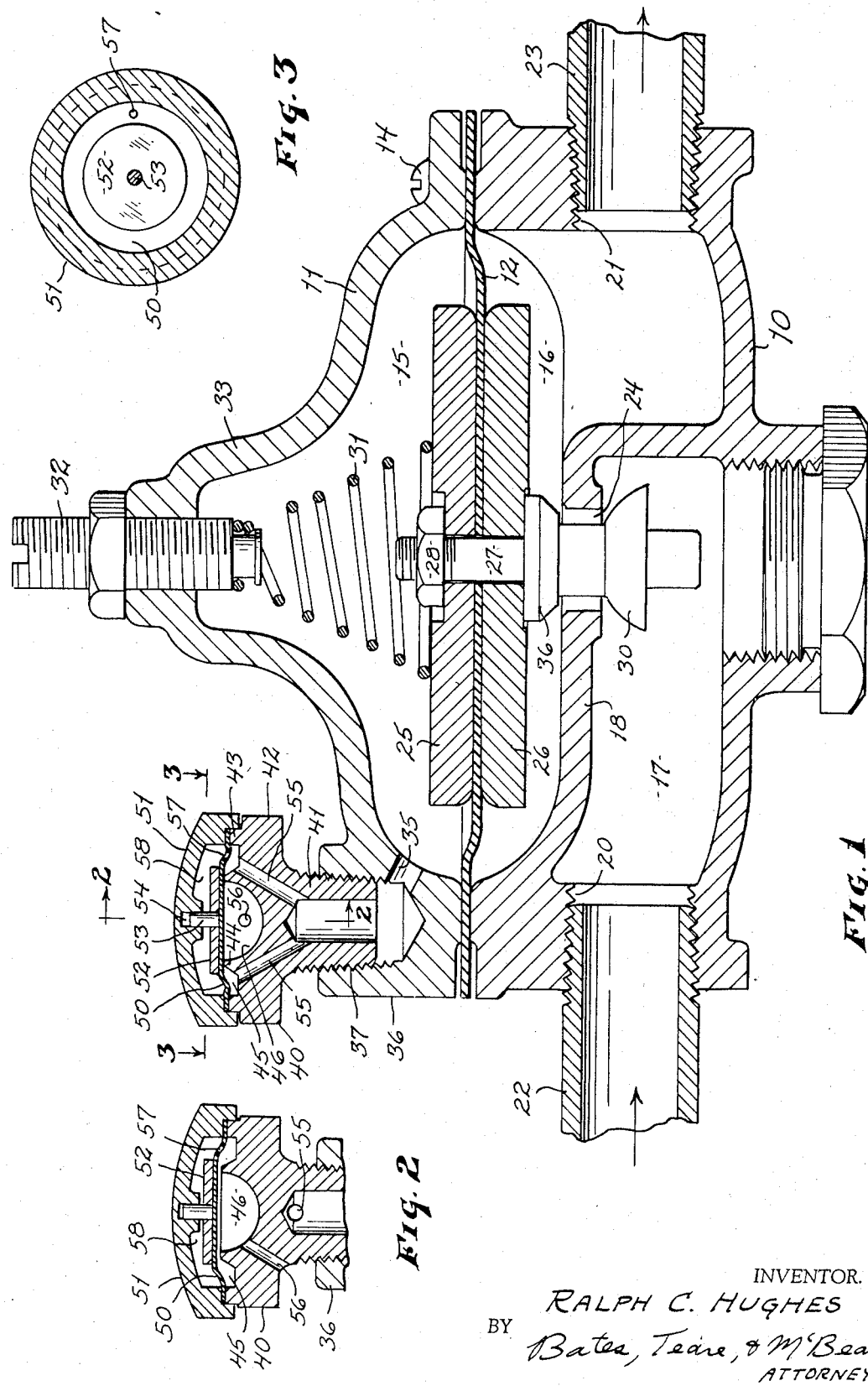
INVENTOR.
RALPH C. HUGHES
BY Bates, Teare, & McBean
ATTORNEYS Patented Sept. 26, 1944

2,359,111

UNITED STATES PATENT OFFICE 2,359,111

AUTOMATIC VENT FOR FLUID PRESSURE REGULATORS

Ralph C. Hughes, Anderson, Ind., assignor to Reynolds Gas Regulator Company, Anderson, Ind., a corporation of Indiana Application September 8, 1941, Serial No. 409,963

5 Claims. (Cl. 50—4)

This invention relates to an automatic vent for fluid pressure regulators and especially to an improved venting mechanism for the atmospheric pressure chamber of diaphragm operated fluid pressure regulators. These therefore are the general objects of this invention.

Fluid pressure regulators of the diaphragm operated type generally comprise a flexible diaphragm having one side exposed to the outlet pressure of the regulator and the other side to atmospheric pressure. A predetermined load is placed on the atmospheric side of the diaphragm, which must be lifted by the pressure in the outlet side of the regulator to cause the diaphragm to close the valve. Obviously, a sufficient decrease in this pressure will cause the diaphragm to open the regulator valve to permit gas to flow through the regulator. Generally the atmospheric side of the diaphragm is covered by a hollow cap which provides an atmospheric pressure chamber, and a venting passageway extends through the wall of this cap to permit the atmospheric pressure chamber to breathe in response to the fluctuations of the diaphragm.

Fluid pressure regulators of the general type above mentioned have several disadvantages, particularly when used with fluids such as natural gas and the like. One of these disadvantages is the fact that when a rupture occurs in the diaphragm, gas may pass therethrough directly to the exterior of the regulator at the full pressure of the supply main. This is a constant source of danger.

In my prior Patents 2,174,515 and 2,183,569, issued to my assignee Reynolds Gas Regulator Company on October 3 and December 19, 1939, respectively, I disclosed and claimed certain arrangements for preventing the escape of gas and the attendant dangers which would result from an inadvertent rupturing of the regulator diaphragm. Such arrangements have decreased the dangers to a great extent. They however do not entirely solve the problem. While such arrangements are highly efficient when a large break or rupture occurs in the diaphragm they do not respond to comparatively small seepages of gas through the diaphragm which do not create high pressures in the atmospheric chamber of the regulator. While dangers due to such seepage are overcome by the arrangement shown in Patent No. 2,174,515, such an arrangement is not always feasible and at times the expense thereof is prohibitive.

Accordingly, one of the important objects of the present invention is to overcome the disadvantages above set forth by providing a regulator venting mechanism which will always shut off the flow of gas through the regulator vent regardless of the pressure or rate of flow of such escaping gas.

A further object is to provide an automatic vent for a fluid pressure regulator which will limit the flow of fluid from the regulator vent at any one time to a predetermined maximum volume of fluid, regardless of the source of such fluid.

Another disadvantage found in regulators of the general type mentioned presents itself when a sudden demand is made on the regulator for an increased flow of gas, as for instance, by the sudden opening of gas burner valves or the like. This sudden demand creates a sudden drop in pressure at the outlet side of the regulator diaphragm, thereby quickly opening the regulator valve to increase the supply flowing from the high pressure main. The sudden opening of the regulator valve quickly increases the pressure at the outlet side of the diaphragm to such extent as to some times cause a complete closing of the regulator valve and an attendant stoppage of the flow of fluid through the regulator, despite the continued demand on the regulator outlet conduit for gas. The continued demand for gas causes the opening and closing cycle of the regulator valve, just described, to occur repeatedly and results in a throbbing or pulsating operation of the regulator and an irregular flow of fluid to the point of consumption, which in the case of natural gas results in an extremely inefficient operation of the appliance with which the regulator is used.

Accordingly, one of the important objects of the present invention is to provide a mechanism which will prevent, or greatly minimize the pulsating operation of the regulator above set forth and thereby insure a highly efficient operation of the appliance with which the regulator is used.

A further object of the present invention is to provide a venting mechanism for a fluid pressure regulator, which mechanism will prevent, for practical purposes, the throbbing operation of the regulator heretofore mentioned, and which mechanism may be easily attached to existing regulators, preferably without removing the regulator from installation or otherwise interrupting the operation of such regulator.

Another object of this invention is to provide a mechanism which may be applied to gas pressure regulators of the general type mentioned, which mechanism will prevent the escape at any one time of more than a predetermined volume of gas from the chamber at the so called atmospheric side of the regulator diaphragm, regardless of the source of such fluid, and which mechanism, at the same time, will prevent, for practical purposes, the throbbing operation of the regulator heretofore mentioned, and thus provide an extremely safe regulator and insure efficient operation of the gas appliance with which the regulator is used.

A further object of the present invention is to provide an automatic vent mechanism which may be applied to existing fluid pressure regulators to overcome the disadvantages heretofore mentioned, and which automatic vent will be comparatively small in size, economical to manufacture, easily applied to divers existing constructions, and at the same time efficient in its operation.

Other objects of the present invention will become more apparent from the following description, reference being had to a preferred embodiment thereof illustrated in the accompanying drawing. The essential features of the invention will be summarized in the claims.

In the drawing, Fig. 1 is a centrally located vertical section through a fluid pressure regulator embodying my invention; Fig. 2 is a vertical section through the automatic vent mechanism as indicated by the lines 2—2 on Fig. 1, illustrating certain of the parts in a different position; and Fig. 3 is a horizontal section as indicated by the correspondingly numbered lines on Fig. 1.

Referring now to the drawing in detail, and particularly to Fig. 1, it will be seen that I have illustrated a fluid pressure regulator comprising a hollow casing 10 surmounted by a hollow cap 11. A flexible gas impervious diaphragm 12 extends across the top of the casing and is held in place by the cap 11 which is secured to the casing by bolts 14. The diaphragm 12 thus divides the body of the regulator into an upper, or atmospheric chamber 15, and a lower, or pressure chamber 16. The casing 10 is provided with an inlet chamber 17 which is separated from the pressure chamber 16 by a wall 18. The inlet chamber 17 is provided with an inlet opening 20, while the pressure chamber 16 is provided with an outlet opening 21. These openings are threaded to receive the high pressure line 22 and the service line 23 which latter communicates with the appliances. The wall 18 between the inlet and outlet openings of the regulator is provided with a valve port opening 24 through which gas may pass from the inlet to the outlet of the regulator.

The diaphragm 12 controls the position of a valve 30 which regulates the passage of fluid from the inlet and outlet of the regulator. As illustrated, the central portion of the diaphragm 12 is clamped between a pair of plates 25 and 26 which reduce the diaphragm area subject to failure or rupture. A valve stem 27 passing through the diaphragm and the plates 25 and 26, is provided with a shoulder against which the diaphragm assembly is positioned by a nut 28. The valve stem extends downward from the diaphragm through the valve port opening 24 in the wall 18, and is provided at its lower end with a valve member 30. The valve 30 is accordingly controlled by the fluctuations of the diaphragm 12.

The diaphragm is normally pressed downward to cause the valve to open and admit fluid to the regulator until the pressure in the pressure chamber 16 reaches the desired outlet pressure. A compression spring 31 is interposed between the upper surface of the plate 25 and a stud 32. This stud is adjustably mounted in an upwardly extending tubular portion 33 of the cap 11 and facilitates the adjustment of the tension on the diaphragm and accordingly controls the outlet pressure of the regulator.

The regulator just described is generally characteristic of those in use at the present time. Ordinarily, the atmospheric chamber 15 of such regulators is provided with a passageway, generally indicated on Fig. 1 at 35, which extends between such chamber and the exterior of the regulator. Such regulators are also provided with a supplemental valve 36 which is mounted on the valve stem 27 above the port 24. When the inlet pressure of the regulator drops below a predetermined minimum, the spring 31 then forces the valve stem to its lowermost position, whereupon the supplemental valve stops the flow of gas through the regulator. It is of course, to be understood that the supplemental valve 36 and its function is often omitted.

The automatic venting mechanism with which the present invention is most particularly concerned will now be described. As shown in Fig. 1, the regulator cap 11 is provided with an upwardly extending boss 36. The passageway 35 extends upward through the boss and is threaded at its upper end as at 37 to receive the automatic vent mechanism. This vent mechanism comprises a body 40 having a reduced externally threaded portion or shank 41 adapted to be threadingly secured in the outer end of the passageway 35, and an enlarged upper head portion 42.

The upper surface of the head 42 of the vent is provided with a pair of upstanding annular ribs 43 and 44 forming an annular groove or channel 45 adjacent the periphery of the head, and a central cavity 46. A flexible gas impervious diaphragm 50 is positioned across the ribs 43 and 44 of the head 42 and is held in contact with the rib 43 by a hollow cap 51 which may be secured to the head in any well known manner. The vent diaphragm 50 is normally held in position against the rib 44 by a weight 52 which is guided by the engagement of an attached stem 53 with a guideway 54 formed in the cap 51.

For the purposes which will be hereinafter understood, the body 40 of the vent is provided with passageways 55 which extend between the passageway 35 and the channel 45 in the vent, and with a passageway 56 which extends between the central cavity 46 and the exterior of the vent and regulator. The vent diaphragm 50 is provided with a comparatively small orifice 57 which extends between the channel 45 and a chamber 58 above the vent diaphragm.

When in the normal operation of the regulator, the main regulator diaphragm 12 lowers, due to a demand on the regulator for gas which causes a decrease in pressure in the regulator chamber 16, a partial vacuum is simultaneously set up in the atmospheric chamber 15 of the regulator. By reason of the passageways 35 and 55, this partial vacuum or reduction of pressure is transmitted to the channel 45 in the vent head, and through the orifice 57 in the vent diaphragm to the chamber 58 thereabove. This causes the vent diaphragm 50 to be forced upward by the atmospheric pressure acting on the region of the central cavity 46. The moving of the vent diaphragm from its seat permits an influx of air through the passageway 56 and the central cavity 46 to the channel 45, and thus to the atmospheric chamber 15 of the regulator. The pressure in this chamber is thus restored to a normal or atmospheric pressure condition.

It will be noted that the vent diaphragm 50 will not lift from its seat (i. e., the rib 44), until a reduction in pressure exists in the chamber 58 thereabove, and until such reduction is sufficient to overcome the action of the comparatively light weight 52. This reduction of pressure is materially retarded by the relatively small size of the orifice 57 in the vent diaphragm. Now when the main or regulator diaphragm 12 suddenly lowers due to a sudden demand on the regulator for gas, the pressure in the atmospheric chamber 15 thereabove suddenly lowers. The delay in the transmissal of this lowered pressure to the chamber 58 above the vent diaphragm maintains for a short period of time, the reduced pressure in the regulator chamber 15, which accordingly partially offsets the action of the spring 31 and slows up the downward movement of the diaphragm. This prevents such sudden rush of gas into the regulator as heretofore initiated the throbbing or pulsating action in the operation of the regulator.

While the dampening action above described occurs when a sudden demand is made on the regulator it has been found that the normal fluctuations of the regulator are in no way affected thereby.

On the other hand, in the normal operation of the regulator, a sudden decreased demand for gas is accompanied by a sudden increase in pressure in the regulator pressure chamber 16 and the regulator diaphragm quickly rises to reduce the flow of gas into the regulator. The rising movement of the diaphragm quickly raises the pressure in the regulator chamber 15. This rise in pressure is transmitted through the passageways 35 and 55 to the channel 45 beneath the vent diaphragm and quickly raises the vent diaphragm from its seat permitting the escape of such pressure through the passageways 56 to bring the pressure in the regulator chamber 15 to atmospheric pressure immediately without retardation.

It will be noted that any material increase in pressure beneath the vent diaphragm 50 immediately raises such diaphragm from its seat and almost instantly brings the pressure in the atmospheric chamber 15 of the regulator to normal. This is accomplished without any retardation such as heretofore described in connection with the operation of the vent when subjected to a sudden decrease in pressure. Thus, when the demand on the regulator suddenly stops, the flow into the regulator is likewise suddenly stopped.

Should the main diaphragm 12 of the regulator rupture, gas at outlet pressure would immediately flow into the atmospheric chamber 15. This pressure would of course raise the vent diaphragm 50 from its seat as heretofore described in connection with the normal operation of the vent and regulator. However, in case of a rupture of the main diaphragm 12, the increase in pressure and flow in the chamber 15 unlike the momentary increase and flow which occurs during normal operation is substantially continuous.

By reason of the orifice 57 in the vent diaphragm, the continued application of pressure on the underside of the vent diaphragm 50 soon causes the pressure in the chamber 58 above this diaphragm to increase. This tends to equalize the pressure on both sides of the vent diaphragm whereupon the weight 52 closes such diaphragm against the rib 44, thereby preventing further escape of gas from the vent. Continued increase in pressure in the chambers 15 and 58 then serve to securely maintain this diaphragm against its seat.

In some instances, the main regulator diaphragm will not rupture, but merely becomes porous, permitting but a slow seepage of gas or other fluid therethrough. If this seepage is slight it will not lift the weight 52 on the vent diaphragm. However, the pressure in the chamber 58 above the vent diaphragm will build up substantially simultaneously with that in the regulator chamber 15. Accordingly, the vent diaphragm will be maintained on its seat by such pressure and there will be no escape of gas from the regulator. When the seepage through the regulator is sufficient to build up a pressure in the vent channel 45 faster than the orifice 57 in the vent diaphragm will permit the equalization of the pressure in the chamber 58, the action of the vent is that heretofore described as taking place consequent upon the rupturing of the regulator diaphragm 12.

Accordingly, it will be seen that for minor seepages through the regulator diaphragm, no gas will escape from the regulator, and upon excessive seepage or rupturing of the regulator diaphragm, gas will escape for the brief interval during which the pressure above the vent diaphragm is being equalized with that below. The arrangement of the orifice 57 between the vent diaphragm and the chamber 58 thereabove and the arrangement of the orifice 56 leading from the vent to the exterior of the regulator, is such that under no condition will more than one half a cubic foot of gas escape from the regulator and this amount will escape only under extreme conditions.

It has been found advantageous to arrange the area of the vent diaphragm exposed to the chamber 58, the area of the channel 45 and the area of the central chamber 46 of the vent so that the area of the vent diaphragm exposed to the chamber 58 is about three times that area of the diaphragm exposed to the central cavity 46 of the vent, and so that the area of the diaphragm 50 which is exposed to the channel 45 is about twice that of the area exposed to the cavity 46. It is also preferable that the cross sectional area of the passageway 56 be from one and one-half to two times the area of the orifice 57 in the vent diaphragm 50 and materially smaller than the combined cross sectional areas of the passageway 55 leading to the channel 45 in the vent.

In regulators using a supplemental valve such as that indicated at 36 and heretofore described, the increase in pressure in the atmospheric chamber 15 after the vent diaphragm has closed, whether in response to a rupture of the main diaphragm or merely from the seepage of gas therethrough, will build up the pressure in the chamber 15 to such an extent that the spring 31 will move the regulator diaphragm downward, closing the supplemental valve 36 against its seat and thus preventing any further flow of gas through the regulator.

From the foregoing description it will be seen that I have provided a vent for a pressure regulator which overcomes the disadvantages of the regulators used in the past and which may be readily installed on regulators now in service without interrupting such service and at a minimum expense.

I claim:

1. A fluid pressure regulator of the flexible diaphragm operated type and having an outlet pressure chamber on one side of the diaphragm and a breathing chamber on the other side thereof, means associated with such breathing chamber to permit a sudden exhausting of air from the breathing chamber consequent upon the sudden raising of the diaphragm due to a sudden increase of pressure in the outlet pressure chamber, said means being constructed and arranged to retard the flow of air into the breathing chamber consequent upon a sudden lowering of the diaphragm due to a sudden decrease of pressure beneath the diaphragm and thereby retard the action of said diaphragm, and to limit the volume of fluid that may escape from the regulator at any one time to a predetermined maximum volume.

2. A fluid pressure regulator of the flexible diaphragm operated type and having an outlet pressure chamber on one side of the diaphragm and a breathing chamber on the other side thereof, a vent comprising a body attached to the breathing chamber of the regulator, passageways in said body communicating with the exterior of the regulator and with said breathing chamber, pressure responsive means carried by said body and cooperating with said passageways to permit a sudden exhausting of air from the regulator breathing chamber substantially simultaneously with a consequent sudden raising of the regulator diaphragm due to a sudden increase of pressure in the outlet pressure chamber of the regulator, and means constructed and arranged to cause a brief period of time to elapse following a sudden lowering of the pressure beneath the diaphragm before any air is permitted to enter the breathing chamber through the vent thereby retarding the action of said diaphragm.

3. A fluid pressure regulator of the flexible diaphragm operated type and having an outlet pressure chamber on one side of the diaphragm and a breathing chamber on the other side thereof, an automatic vent secured to the breathing chamber, a passageway in said vent leading from the breathing chamber to the exterior of the regulator and vent, valve means normally obstructing said passageway, wherein said valve means are constructed and arranged to permit sudden exhausting of air from the breathing chamber consequent upon the sudden raising of the diaphragm due to a sudden increase of pressure in the outlet pressure chamber and to retard the flow of air into the breathing chamber consequent upon a lowering of the pressure beneath the diaphragm and thereby retard the action of said diaphragm, and to limit the volume of fluid that may escape from the regulator at any one time to a predetermined maximum volume.

4. A fluid pressure regulator of the flexible diaphragm operated type having an outlet pressure chamber on one side of the diaphragm and a breathing chamber on the other side thereof provided with a passageway extending to the exterior of the regulator, an automatic vent secured to the breathing chamber of the regulator and having a passageway leading from the breathing chamber passageway to the exterior of the vent, means carried by said vent and associated with said passageways to suddenly and immediately exhaust air from the breathing chamber of the regulator consequent upon the sudden raising of the diaphragm due to a sudden increase of pressure in the regulator outlet pressure chamber and means to cause a period of time to elapse after a sudden lowering of the pressure beneath the diaphragm before any air may enter the regulator breathing chamber through the vent.

5. A fluid pressure regulator of the flexible diaphragm operated type having an outlet pressure chamber on one side of the diaphragm and a breathing chamber on the other side thereof, a vent being secured to the breathing chamber of the regulator, said vent having a passageway leading from the breathing chamber to the exterior of the vent, valve means normally obstructing said passageway and means whereby said valve will suddenly and substantially immediately exhaust air from the breathing chamber consequent upon the sudden raising of the regulator diaphragm due to a sudden increase of pressure in the outlet pressure chamber of the regulator, said last named means being constructed and arranged to retard the flow of air into the breathing chamber consequent upon a sudden lowering of the pressure beneath the regulator diaphragm and to limit the volume of fluid that may escape from the vent at any one time to a predetermined maximum volume.

RALPH C. HUGHES.